US012417788B2

(12) United States Patent
He et al.

(10) Patent No.: US 12,417,788 B2
(45) Date of Patent: Sep. 16, 2025

(54) VIDEO PROCESSING METHOD AND APPARATUS, ELECTRONIC DEVICE AND STORAGE MEDIUM

(71) Applicant: BEIJING ZITIAO NETWORK TECHNOLOGY CO., LTD., Beijing (CN)

(72) Inventors: Siqi He, Beijing (CN); Yuxuan Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/542,626

(22) Filed: Dec. 16, 2023

(65) Prior Publication Data

US 2024/0119969 A1  Apr. 11, 2024

Related U.S. Application Data

(63) Continuation of application No. PCT/CN2022/105073, filed on Jul. 12, 2022.

(30) Foreign Application Priority Data

Jul. 13, 2021 (CN) .......................... 202110800232.5

(51) Int. Cl.
*G11B 27/00* (2006.01)
*G06F 3/0481* (2022.01)
(Continued)

(52) U.S. Cl.
CPC .......... *G11B 27/031* (2013.01); *G06F 3/0481* (2013.01); *G06F 3/04842* (2013.01)

(58) Field of Classification Search
CPC .......... G11B 27/00; G11B 31/00; G06F 3/00; G06F 3/0481; G06F 3/04842
(Continued)

(56) References Cited

U.S. PATENT DOCUMENTS 8,479,228 B1 * 7/2013 Simon .................. H04N 21/254
725/35
10,467,518 B1 * 11/2019 Schweinfurth .. G06K 19/07758
(Continued)

FOREIGN PATENT DOCUMENTS

CN      104394481 A      3/2015
CN      105917626 A      8/2016
(Continued)

OTHER PUBLICATIONS

International Search Report (with English translation) and Written Opinion issued in PCT/CN2022/105073, dated Oct. 10, 2022, 11 pages provided.
(Continued)

*Primary Examiner* — Daquan Zhao
(74) *Attorney, Agent, or Firm* — Fish & Richardson P.C.

(57) ABSTRACT

A video processing method and apparatus, an electronic device and a storage medium are provided. The method includes: displaying an identifier of a target video in a session interface, the target video being a video sent or received by a current user; displaying a preset control in an associated position of the identifier; and in response to a triggering of the preset control, executing a target action on the basis of the target video.

20 Claims, 5 Drawing Sheets

(51) Int. Cl.
*G06F 3/04842* (2022.01)
*G11B 27/031* (2006.01)
*G11B 31/00* (2006.01)
*G06F 3/00* (2006.01)

(58) Field of Classification Search
USPC .................. 386/278, 280, 239, 241, 248
See application file for complete search history.

(56) References Cited

U.S. PATENT DOCUMENTS

| | | | |
|---|---|---|---|
| 2013/0283301 A1 | 10/2013 | Avedissian et al. | |
| 2014/0359018 A1 | 12/2014 | Sun | |
| 2015/0172238 A1 | 6/2015 | Ahmed et al. | |
| 2018/0146254 A1* | 5/2018 | Tang | H04N 21/41407 |
| 2018/0183738 A1* | 6/2018 | Parnell | G06Q 50/01 |
| 2020/0289947 A1 | 9/2020 | Yin | |
| 2022/0245734 A1 | 8/2022 | Wang et al. | |
| 2022/0263877 A1* | 8/2022 | Conlin | H04L 65/765 |

FOREIGN PATENT DOCUMENTS

| | | |
|---|---|---|
| CN | 109983429 A | 7/2019 |
| CN | 112087652 A | 12/2020 |
| CN | 112187619 A | 1/2021 |
| CN | 112751744 A | 5/2021 |
| CN | 112907384 A | 6/2021 |
| CN | 112911379 A | 6/2021 |
| CN | 113542902 A | 10/2021 |
| EP | 2753076 A2 | 7/2014 |
| EP | 4145776 A1 | 3/2023 |

OTHER PUBLICATIONS

Communication pursuant to Article 94(3) EPC for European Application No. 22841344.9, mailed May 6, 2025, 4 pages.
Notice of Refusal for Japanese Application No. 2023-579150, mailed Mar. 4, 2025, 08 pages.

* cited by examiner

VIDEO PROCESSING METHOD AND APPARATUS, ELECTRONIC DEVICE AND STORAGE MEDIUM

The present application is a continuation of International Application No. PCT/CN2022/105073, filed on Jul. 12, 2022 which claims priority to Chinese Patent Application No. 202110800232.5, titled "VIDEO PROCESSING METHOD AND APPARATUS, ELECTRONIC DEVICE AND STORAGE MEDIUM", filed on Jul. 13, 2021 with the China National Intellectual Property Administration, both of which are incorporated herein by reference in their entireties.

FIELD

The present application relates to the technical field of information technology, and in particular to a video processing method, a video processing apparatus, an electronic device and a storage medium.

BACKGROUND

With a rapid development of terminal technology and network technology, video applications usually have functions such as posting works and chatting. Users can create and post wonderful videos, or record daily life and post videos taken casually in life through video applications. Users can also share videos taken casually within the applications.

SUMMARY

In order to solve or at least partially solve the above technical problem, a video processing method, a video processing apparatus, an electronic device and a storage medium are provided according to embodiments of the present application, which achieves a purpose of simplifying the video processing process in conversation scenarios, and is beneficial for improving video processing efficiency.

In a first aspect, a video processing method is provided according to an embodiment of the present application. The video processing method includes:
- displaying an identifier of a target video on a session interface, where the target video is a video sent or received by a current user;
- displaying a preset control at an associated position of the identifier; and
- performing a target operation based on the target video in response to a triggering of the preset control.

In a second aspect, a video processing apparatus is provided according to an embodiment of the present application. The video processing apparatus includes: a first display module, a second display module and a processing module.

The first display module is configured to display an identifier of a target video on a session interface, where the target video is a video sent or received by a current user.

The second display module is configured to display a preset control at an associated position of the identifier.

The processing module is configured to perform a target operation based on the target video in response to a triggering of the preset control.

In a third aspect, an electronic device is provided according to an embodiment of the present application, and includes: one or more processors; a memory storage configured to store one or more programs. The one or more programs, when executed by the one or more processors, cause the one or more processor to implement the video processing method described above.

In a fourth aspect, a computer-readable storage medium is provided according to an embodiment of the present application, a computer program is stored on the computer-readable storage medium. The computer program, when executing by a processor, implements the video processing method described above.

In a fifth aspect, a computer program product is provided according to an embodiment of the present application. The computer program product includes a computer program or instruction. The computer program or instruction, when executed by a processor, implements the video processing method described above.

BRIEF DESCRIPTION OF THE DRAWINGS

The above and other features, advantages and aspects of embodiments of the present application become more apparent in conjunction with the drawings and with reference to the following specific embodiments. Identical or similar reference signs indicate identical or similar elements throughout the drawings. It should be understood that, the drawings are schematic, and components and elements may not necessarily be drawn to scale.

DETAILED DESCRIPTION OF EMBODIMENTS

Figure 1:
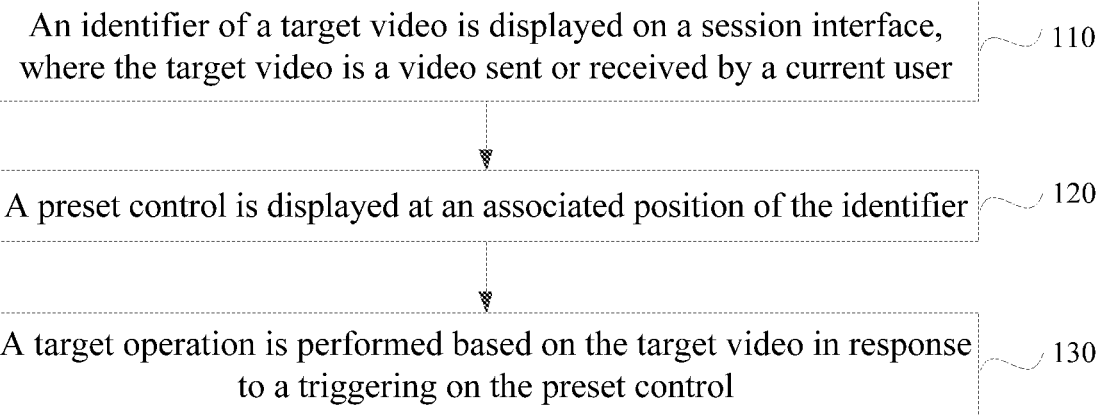
FIG. 1 is a flowchart of a video processing method according to an embodiment of the present application.

Embodiments of the present application will be described in more detail below with reference to the drawings. Although certain embodiments of the present application are shown in the drawings, it should be understood that the embodiments of the present application may be embodied in various forms and should not be construed as limited to the embodiments set forth herein. On the contrary, these embodiments are provided for a more thorough and complete understanding of the present application. It should be understood that the drawings and embodiments of the present application are for exemplary purposes only, and are not intended to limit the protection scope of the present application.

It should be understood that the various steps described in the method implementations of the embodiments of the present application may be executed in different orders or executed in parallel. Additionally, the method implementations may include additional steps and/or omit performing illustrated steps. The scope of the present application is not limited in this respect.

As used herein, the term "comprise" and its variations are open-ended, i.e. "including but not limited to". The term "based on" means "based at least in part on". The term "one embodiment" means "at least one embodiment". The term "another embodiment" means "at least one another embodiment". The term "some embodiments" means "at least some embodiments." Relevant definitions of other terms will be given in the description below.

It should be noted that concepts such as "first" and "second" mentioned in the embodiments of the present application are only used to distinguish different devices, modules or units, and are not used to limit the sequence of functions performed by these devices, modules or units or interdependence therebetween.

It should be noted that the modifications of "one" and "multiple" mentioned in the embodiments of the present application are illustrative and not restrictive, and those skilled in the art should understand that unless the context clearly indicates otherwise, it should be understood as "one or more".

The names of messages or information exchanged between multiple devices in the embodiments of the present application are used for illustrative purposes only, and are not intended to limit the scope of the messages or information.

FIG. 1 is a flowchart of a video processing method according to an embodiment of the present application, which is applicable to a terminal. The method may be executed by a video processing apparatus. The apparatus may be implemented in software and/or hardware. The apparatus may be configured in an electronic device, such as a terminal. The terminal includes, but is not limited to, a smartphone, a handheld computer, a tablet computer, a wearable device with a display screen, a desktop computer, a laptop computer, an all-in-one computer, a smart home device (such as a desk lamp), and so on.

As shown in FIG. 1, this method may specifically include the following steps S110 to S130.

In Step 110, an identifier of a target video is displayed on a session interface, where the target video is a video sent or received by a current user.

The session interface may be an instant messaging interface or a non-instant messaging interface. An interface that can send messages to the other party and receive messages from the other party is a session interface.

In an embodiment, the target video is a video sent by the current user. That is, the current user sends the target video to a user in a session. In this scenario, the identifier of the target video is displayed on the session interface by: displaying the identifier of the target video on the session interface in response to a sending instruction for the target video. That is, the identifier of the target video is displayed on the session interface when the current user triggers the sending instruction for the target video. Further, the identifier of the target video is usually the first frame image of the target video or another frame image of the target video. In other words, the identifier of the target video is usually a cover of the target video (for example, identifier 210 or identifier 220 in FIG. 2). It can be understood that a player identifier the identifier of the target video are bound and displayed together (for example, identifier 211 or identifier 221 in FIG. 2). When the user triggers the player identifier (for example, identifier 211 or identifier 221 in FIG. 2) bound to the identifier of the target video for display, a system plays the target video and the user can watch the target video.

In another embodiment, the target video is a video received by the current user. That is, a video is sent by a user in a session. In this scenario, the identifier of the target video is displayed on the session interface by: displaying the identifier of the target video on the session interface in response to receiving the target video. In other words, the identifier of the target video is displayed on the session interface in response to a receiving instruction for the target video.

Figure 2:
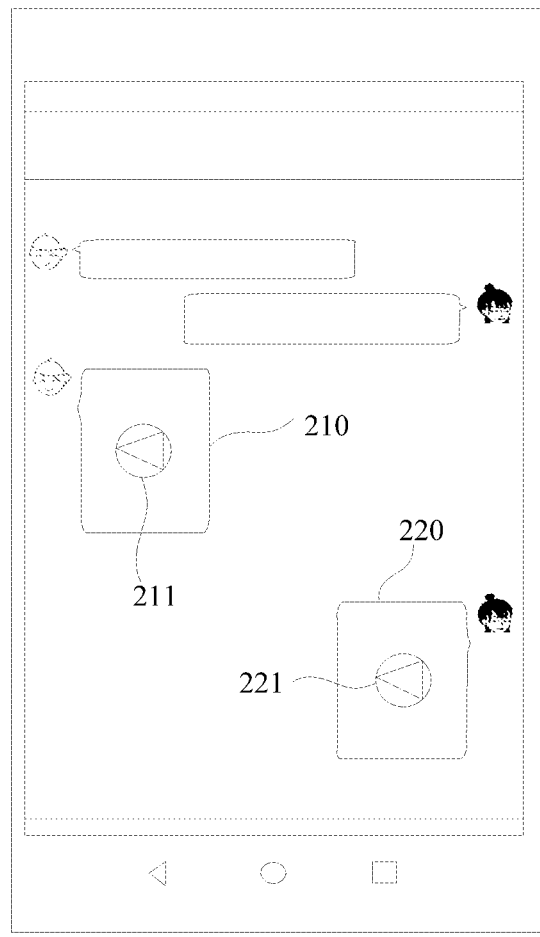
FIG. 2 is a schematic diagram of a session interface according to an embodiment of the present application.

Exemplarily, reference is made to a schematic diagram of a session interface shown in FIG. 2. The session interface includes an identifier 210 of a first target video, a player identifier 211 bound to the first target video for display, an identifier 220 of a second target video, and a player identifier 221 bound to the second target video for display. When the user triggers the player identifier 211, a system plays the first target video. When the user triggers the player identifier 221, the system plays the second target video. The first target video is a video received by the current user, and the second target video is a video sent by the current user.

In Step 120, a preset control is displayed at an associated position of the identifier.

Figure 3:
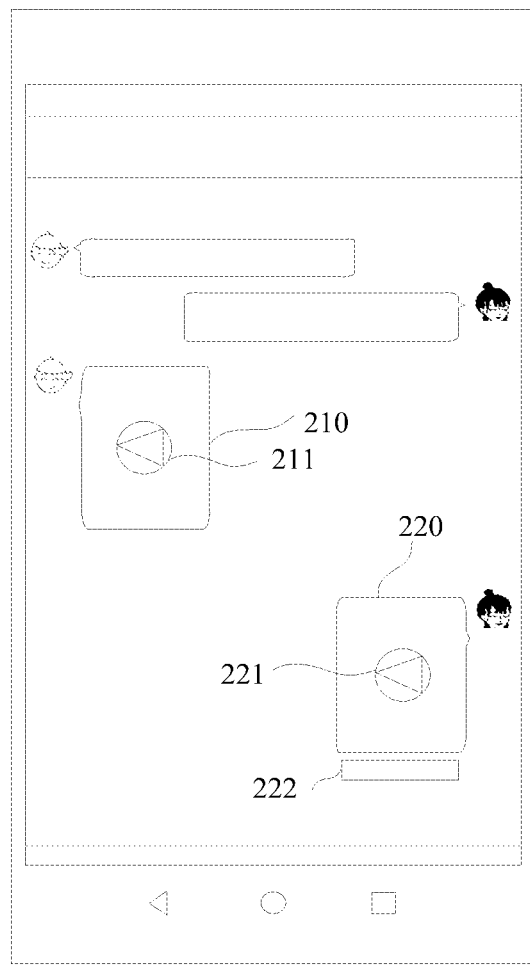
FIG. 3 is a schematic diagram of a session interface according to an embodiment of the present application.

In an embodiment, the target video is a video sent by the current user to a user in a session. The preset control includes a video posting control. FIG. 3 is a schematic diagram of a session interface. In FIG. 3, the second target video is a video sent by the current user, and a video posting control 222 is displayed at an associated position of the identifier 220 of the second target video. The associated position may be a position around the identifier, for example, a position below a cover of the target video or on the right side of the identifier.

Further, the video posting control 222 may include a "posted as daily life" control and a "posted as work" control. The target video can be posted as daily by triggering the "posted as daily life" control. The target video can be posted as a work by triggering the "posted as work" control. Usually, a video as daily is not edited. A video as a work often has been edited to achieve better video effects, in order to achieve the purpose of sharing high-quality videos and enhancing enjoyment.

Figure 4:
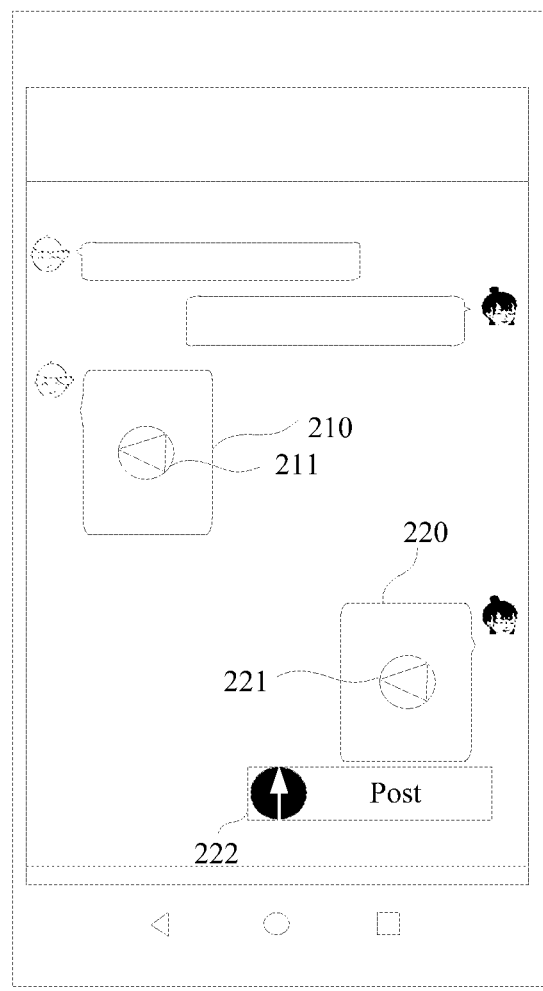
FIG. 4 is a schematic diagram of a session interface according to an embodiment of the present application.

In order to reduce the use difficulty of the user and enable the user to quickly understand the function of the video posting control 222, guide information may be displayed on the video posting control 222. The guide information may be such as "post". FIG. 4 is a schematic diagram of a session interface. The guide information "post" is displayed on the video posting control 222.

Figure 5:
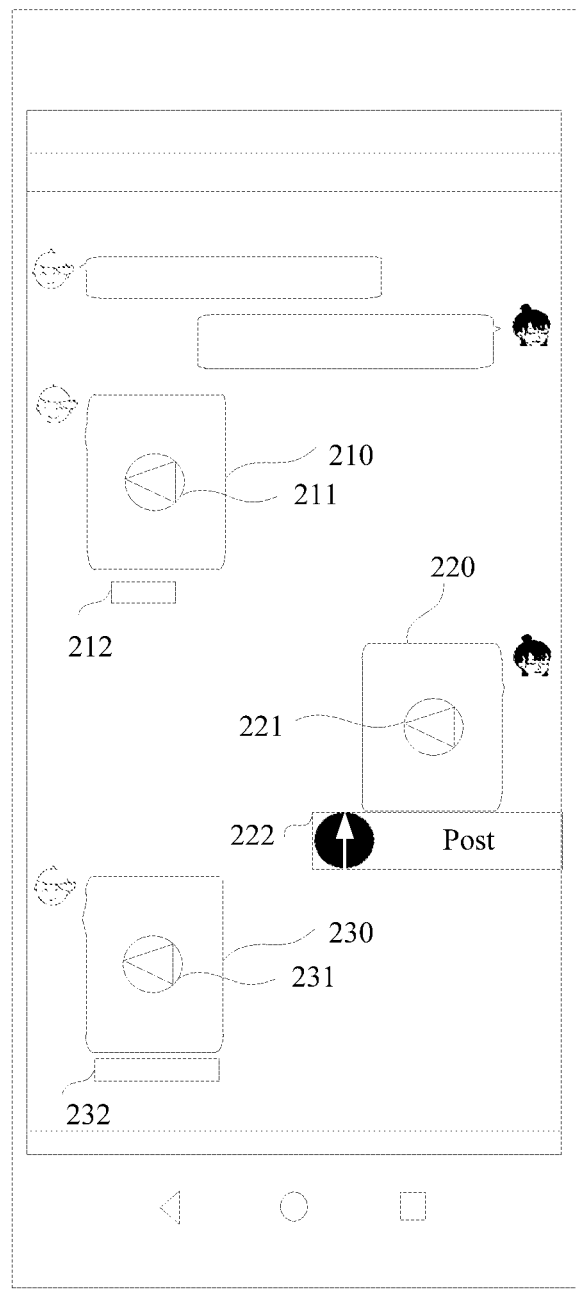
FIG. 5 is a schematic diagram of a session interface according to an embodiment of the present application.

In another embodiment, the target video is a video received by the current user. The preset control includes a video capture control and/or an associated-object control. As shown in FIG. 5, the first target video is a video received by the current user, and a video capture control 212 is displayed at the associated position of the identifier 210 of the first target video. A third target video is a video received by the current user, and an associated-object control 232 is displayed at the associated position of the identifier 230 of the third target video.

In an embodiment, for the target video received by the current user, if some special effects preset by the system are added to the target video or the target video is captured based on a capture mode/shooting special effect preset by the system, the video capture control is displayed at the associated position of the identifier of this target video. The video capture control 212 may display guide information such as "Same prop". In the case that the current user triggers the video capture control to capture a video, the same special effect as the target video is automatically added, or the same capture mode/shooting special effect as the target video is automatically adopted, to simplify the user's operation process for video processing on the session interface, and improve the video processing efficiency.

If content of the target video includes a preset object, such as delicious food, beauty, and other preset objects, an associated-object control is displayed at the associated position of the identifier of the target video. The current user may enter an interface related to the associated object by triggering the associated-object control. For example, if the associated object is delicious food, the interface related to the associated object may be an interface for playing a video for teaching a cooking method of the delicious food, an interface of a store that sells the delicious food, or an interface for placing an order, and so on. It can be understood that, if it is detected that some preset special effects preset by the system are added to the target video, or the target video is captured based on the system capture mode/shooting special effect preset by the system, and it is detected that the content of the target video includes the preset object, the video capture control and the associated-object control are both displayed at the associated position of the identifier of the target video, so as to facilitate the user's operation.

In Step 130, a target operation is performed based on the target video in response to a triggering of the preset control.

In an embodiment, if the preset control is a video posting control, the target operation is performed based on the target video in response to a triggering of the video posting control by generating a user work based on the target video and posting the generated user work.

The user work may is generated based on the target video, by adding some special effects based on the content of the target video in a preset algorithm to generate the user work. For example, a beauty effect may be automatically added to the target video if the target video includes a person. A special effect such as a filter may be automatically added to the target video, if the target video includes scenery. In this way, the user work with better effect can be obtained.

Further, the user may independently edit the target video, so as to generate the user work. Exemplarily, before the user work is posted, the target operation is performed based on the target video, by switching from the session interface to a video posting interface; and performing editing processing on the target video to generate the user work in response to an editing instruction for the target video that is triggered based on the video posting interface. In an embodiment, the video posting interface includes a posting identifier. If the user triggers the posting identifier, the user work is posted, which can simplify the video posting process. In summary, the user work is generated based on the target video and is posted in response to a posting instruction triggered based on a current interface, where the current interface includes the video posting interface.

In another embodiment, before the user work is generated and posted based on the target video, the target operation is performed based on the target video, by displaying a posting confirmation window; and continuing to perform an operation of the generating the user work based on the target video and posting the user work, in the case that a confirmation instruction triggered based on the posting confirmation window is received. For example, the session interface includes the posting confirmation window. If the user triggers a control "Post immediately" in the posting confirmation window, the operation of the generating the user work based on the target video and posting the user work is continue to be performed. The probability of mistakenly posting a video by the user can be reduced by displaying the posting confirmation window.

In an embodiment, the target video may be directly posted as the user work, so as to improve posting speed and reduce the waiting time of the user. Specifically, the user work is generated and posted based on the target video, by directly posting the target video as the user work in response to the confirmation instruction.

Further, the target operation may be performed based on the target video, by displaying a video-posting progress indicator at a preset position of the session interface, so as to facilitate the user to check, without affecting continuing to send or receive chat messages on the session interface by the user.

In an embodiment, in the case that the target video is a video received by the current user, the preset control includes a video capture control. The target operation may be performed based on the target video in response to the triggering of the preset control, by displaying a video capture interface in a target capture mode in response to a triggering of the video capture control, where the target capture mode is a capture mode associated with the target video.

For example, if the target video is captured in a zoom-in mode, a video capture interface in the zoom-in mode is displayed. A video captured by the user based on the capture interface automatically has a zoom-in effect (for example, a special effect such as the mouth of a person becoming large in the video), without manual intervention by the user, which can improve convenience and efficiency of the operation. The capture mode associated with the target video may be understood as some special effects added to the target video, such as a beauty effect, a filter effect, and so on. If these special effects are added to the target video, a video capture interface that automatically applies the special effects is displayed when the user triggers the video capture control, and the video captured by the user based on the video capture interface automatically has special effects such as the beauty effect or the filter effect.

Further, a posting identifier may also be displayed on the video capture interface. If the user triggers the posting identifier, a user work is generated based on the captured video and then is posted, or the captured video is directly posted as a user work, so as to simplify the video posting process. In summary, a user work is generated based on the target video and is posted in response to a posting instruction triggered based on the current interface, and the current interface includes the video capture interface.

In an embodiment, after the target operation is performed based on the target video, the method further includes: switching back to the session interface from the current interface, to facilitate the user to continue to send or receive chat messages based on the session interface, where the current interface includes the video posting interface or the video capture interface.

In another embodiment, in the case that the target video is a video received by the current user, the preset control includes an associated-object control. The target operation is performed based on the target video in response to the triggering of the preset control, by displaying a preset interface associated with a target object in the target video in response to a triggering on the associated-object control. The target object may be, for example, delicious food, beauty, and so on. If the target object is delicious food, the preset interface associated with the target object may be an interface for playing a video for teaching a cooking method of the delicious food, an interface of a store that sells the delicious food, or an interface for placing an order, and so on. By displaying the associated-object control, the user can quickly obtain more relevant information, the operation process for the user obtaining the information can be simplified, the efficiency of the user obtaining information is improved.

With the video processing method according to the embodiments of the present application, the identifier of the target video is displayed on the session interface. The target video is a video sent or received by the current user. The preset control is displayed at the associated position of the identifier, and the target operation is performed based on the target video in response to the triggering of the preset control. The operation process for processing the target video is simplified in the conversation scenarios, the video processing efficiency is improved.

Figure 6:
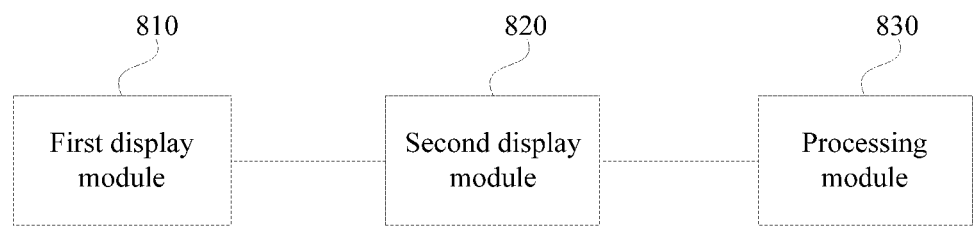
FIG. 6 is a structural schematic diagram of a video processing apparatus according to an embodiment of the present application.

FIG. 6 is a structural schematic diagram of a video processing apparatus according to an embodiment of the present application. The video processing apparatus according to the embodiment of the present application may be configured in a client. As shown in FIG. 6, the video processing apparatus may include a first display module 810, a second display module 820, and a processing module 830.

The first display module 810 is configured to display an identifier of a target video on a session interface, where the target video is a video sent or received by a current user. The second display module 820 is configured to display a preset control at an associated position of the identifier. A processing module 830 is configured to perform a target operation based on the target video in response to a triggering of the preset control.

In an embodiment, the target video is a video sent by the current user to a user in the session, and the preset control includes a video posting control. The first display module 810 is specifically configured to display the identifier of the target video on the session interface in response to a sending instruction for the target video. The processing module 830 is specifically configured to generate a user work based on the target video and post the user work, in response to a triggering on the video posting control.

In an embodiment, the processing module 830 further includes a first display unit configured to display a posting confirmation window before the user work is generated and posted based on the target video; and an operation unit configured to continue to perform an operation of generating the user work based on the target video and posting the user work in a case that a confirmation instruction triggered based on the posting confirmation window is received.

In an embodiment, the processing module 830 is specifically configured to directly post the target video as the user work in response to the confirmation instruction.

In an embodiment, the processing module 830 further includes: a switching unit configured to switch from the session interface to a video posting interface before the user work is posted; a generating unit configured to perform editing processing on the target video to generate the user work in response to an editing instruction for the target video that is triggered based on the video posting interface; and a first posting unit configured to generate the user work based on the target video and posting the user work in response to a posting instruction triggered based on a current interface, where the current interface includes the video posting interface.

In an embodiment, the target video is a video received by the current user, and the preset control includes a video capture control. The first display module 810 is specifically configured to display an identifier of the target video on the session interface in response to a receiving instruction of the target video. The processing module 830 includes a second display unit configured to display a video capture interface in a target capture mode in response to a triggering on the video capture control, where the target capture mode is a capture mode associated with the target video; and a second posting unit configured to generate a user work based on the target video and posting the user work in response to a posting instruction triggered based on a current interface, where the current interface includes the video capture interface.

In an embodiment, the video processing apparatus further includes a switching module configured to switch back to the session interface from the current interface after the target operation is performed based on the target video, where the current interface includes the video posting interface or the video capture interface.

In an embodiment, the processing module 830 further includes a third display unit configured to display a video-posting progress indicator at a preset position of the session interface.

In an embodiment, the target video is a video received by the current user, and the preset control includes an associated-object control. The first display module 810 is specifically configured to display an identifier of the target video on the session interface in response to a receiving instruction of the target video. The processing module 830 is specifically configured to display a preset interface associated with a target object in the target video in response to a triggering on the associated-object control.

With the video processing apparatus provided according to the embodiments of the present application, the identifier of the target video is displayed on the session interface, where the target video is the video sent or received by the current user. The preset control is displayed at the associated position of the identifier. The target operation is performed based on the target video in response to the triggering of the preset control. In conversation scenarios, the operation process for processing the target video is simplified, the video processing efficiency is improved.

The video processing apparatus according to the embodiments of the present application can perform the steps in the video processing method according to the embodiments of the present application. The specific execution steps and the beneficial effects are not repeated here.

Figure 7:
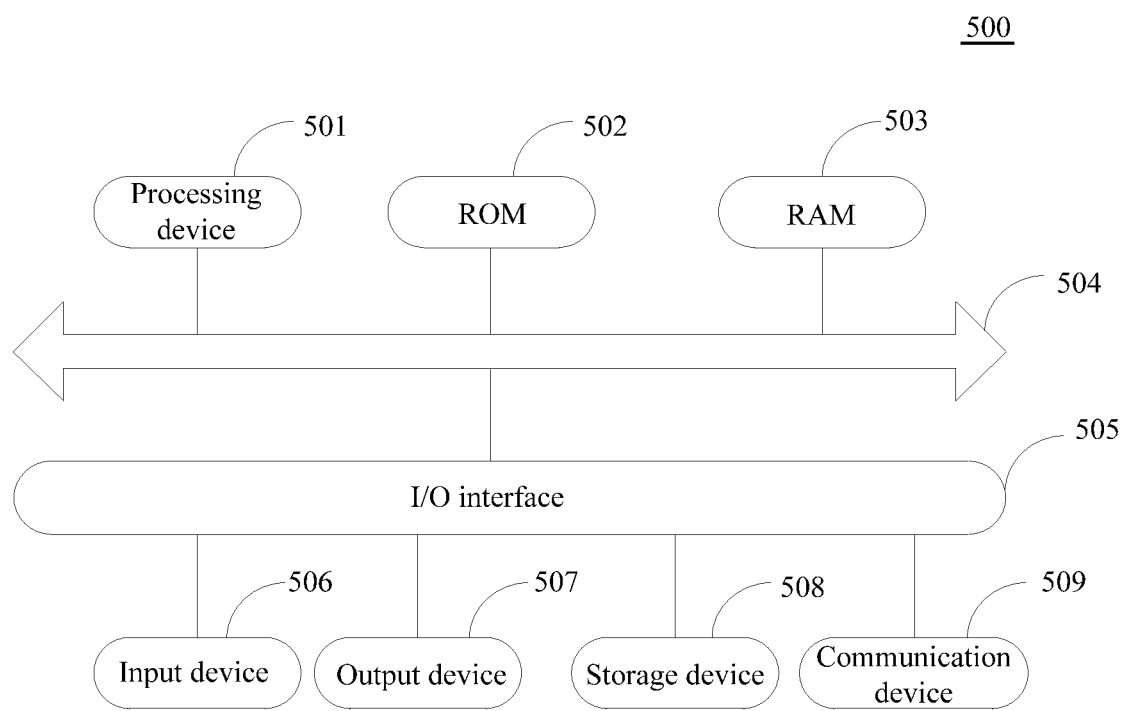
FIG. 7 is a structural schematic diagram of an electronic device according to an embodiment of the present application.

FIG. 7 is a structural schematic diagram of an electronic device according to an embodiment of the present application. Reference is made to FIG. 7, which is a structural schematic diagram of an electronic device 500 suitable for implementing the embodiment of the present application. The electronic device 500 in the embodiment of the present application may include, but is not limited to, a mobile terminal such as a mobile phone, a notebook computer, a digital broadcast receiver, a personal digital assistant (PDA), a PAD (a tablet personal computer), a portable multimedia player (PMP), a vehicle-mounted terminal (for example, an in-vehicle navigation terminal), a wearable electronic device; and a stationary terminal such as a digital TV, a desktop computer, a smart home devices. The electronic device shown in FIG. 7 is only an example and should not impose any limitation on the function and the use range of the embodiment of the present application.

As shown in FIG. 7, the electronic device 500 may include a processing device 501 (for example, a central processing unit, a graphics processor, and the like), which may execute various appropriate operations and processes according to programs stored in a read-only memory (ROM) 502 or programs loaded from a storage device 508 into a random access memory (RAM) 503 to implement the methods of the embodiments in the present application. In the RAM 503, various programs and data required for the operation of the electronic device 500 are also stored. The processing device 501, the ROM 502, and the RAM 503 are connected to each other through a bus 504. An input/output (I/O) interface 505 is also connected to the bus 504.

In general, the following devices may be connected to the I/O interface 505: an input device 506 including, for example, a touch screen, a touch pad, a keyboard, a mouse, a camera, a microphone, an accelerometer, a gyroscope, and the like; an output device 507 including, for example, a liquid crystal display (LCD), a speaker, a vibrator, and the like; a storage device 508 including, for example, a magnetic tape, a hard disk, and the like; and a communication device 509. The communication device 509 may allow the electronic device to communicate wirelessly or by wire with other devices to exchange data. Although FIG. 7 shows the electronic device having various devices, it should be understood that not all of the illustrated devices are required to be implemented or available. More or fewer devices may alternatively be implemented or provided.

In particular, according to the embodiments of the present application, the processes described above with reference to the flowcharts may be implemented as computer software programs. For example, a computer program product is provided according to an embodiment of the present application, and includes a computer program carried on a non-transitory computer-readable medium. The computer program includes program codes for implementing the method shown in the flowchart, thereby implementing the video processing method described above. In the embodiment, the computer program may be downloaded and installed from the network through the communication device 509, or installed from the storage device 508, or installed from the ROM 502. When the computer program is executed by the processing device 501, the functions defined in the methods of the embodiments of the present application are executed.

It should be noted that the computer-readable medium of the present application may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof. In the embodiments of the present application, the computer-readable storage medium may be any tangible medium that includes or stores a program that may be used by or used in conjunction with an instruction execution system, apparatus, or device. In the embodiments of the present application, the computer-readable signal medium may include a data signal propagated in baseband or as part of a carrier wave with computer-readable program code embodied thereon. A variety of forms are adopted for the propagated data signals, and include but not limited to electromagnetic signals, optical signals, or any suitable combination thereof. The computer-readable signal medium may also be any computer-readable medium other than a computer-readable storage medium, and the computer readable signal medium may transmit, propagate, or transport the program used by or used in connection with the instruction execution system, apparatus, or device. Program codes embodied on a computer-readable medium may be transmitted by any suitable medium including, but not limited to, an electrical wire, an optical cable, radio frequency (RF), and so on, or any suitable combination thereof.

In some embodiments, a client and a server may use any currently known or future-developed network protocol such as hypertext transfer protocol (HTTP) to communicate, and may interconnect with any form or medium digital data communications (for example, a communications network). Examples of the communication network include a local area network ("LAN"), a wide area networks ("WAN"), an internetwork (for example, the Internet), and a peer-to-peer network (for example, ad hoc peer-to-peer networks), as well as any currently known or future-development networks.

The computer-readable medium may be included in the electronic device, or may exist independently without being assembled into the electronic device.

The computer-readable medium carries one or more programs. The one or more programs, when executed by the electronic device, cause the electronic device to: display an identifier of a target video on a session interface, where the target video is a video sent or received by a current user; display a preset control at an associated position of the identifier; and perform a target operation based on the target video in response to a triggering on the preset control.

Optionally, the one or more programs, when executed by the electronic device, cause the electronic device to perform other steps of the embodiments described above.

Computer program codes for performing operations of the present application may be written in one or more programming languages. The programming languages includes but not limited to object-oriented programming languages, such as Java, Smalltalk, C++, also includes conventional procedural programming languages, such as the "C" language or similar programming languages. The program codes may be executed entirely on a computer of a user, partly on a computer of a user, as a stand-alone software package, partly on a computer of a user and partly on a remote computer, or entirely on a remote computer or server. In the case of a remote computer, the remote computer may be connected to a computer of a user through any kind of networks including a local area network (LAN) or a wide area network (WAN), or may be connected to an external computer (for example, connected through the Internet from an Internet service provider).

The flowcharts and block diagrams in the Figures illustrate the architecture, functionality, and operation that may be implemented by systems, methods and computer program products according to various embodiments of the present application. In this regard, each block in the flowcharts or block diagrams may represent a module, program segment, or part of codes, and the module, program segment, or part of codes includes one or more executable instructions for implementing specified logical functions. It should also be noted that, in some alternative implementations, the functions noted in the blocks may also be implemented out of the orders noted in the figures. For example, in fact, two blocks shown in succession may be executed substantially concurrently, or the two blocks may be executed in the reverse order sometimes, depending upon the functionality involved. It is also noted that each block of the block diagrams and/or the flowcharts, and combinations of blocks in the block diagrams and/or the flowcharts, may be implemented in dedicated hardware-based systems that perform the specified functions or operations, or may be implemented by a combination of dedicated hardware and computer instructions.

The units involved in the embodiments of the present application may be implemented in a software manner, or in a hardware manner. The name of the unit does not constitute a limitation of the unit itself under certain circumstances.

The functions described herein may be at least partially performed by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD) and so on.

In the description of the present application, a machine-readable medium may be a tangible medium that may include or store a program used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any suitable combination thereof.

According to one or more embodiments of the present application, a video processing method is provided by the embodiments of the present application, and includes: displaying an identifier of a target video on a session interface, where the target video is a video sent or received by a current user; displaying a preset control at an associated position of the identifier; and performing a target operation based on the target video in response to a triggering on the preset control.

According to one or more embodiments of the present application, in the video processing method provided by the embodiments of the present application, the target video is a video sent by the current user to a user in a session, and the preset control includes a video posting control. The displaying the identifier of the target video on the session interface includes: displaying the identifier of the target video on the session interface in response to a sending instruction for the target video. The performing the target operation based on the target video in response to the triggering of the preset control includes: generating a user work based on the target video and posting the user work in response to a triggering on the video posting control.

According to one or more embodiments of the present application, in the video processing method provided by the embodiments of the present application, before the generating the user work based on the target video and posting the user work, the performing the target operation based on the target video further includes: displaying a posting confirmation window; and continuing to perform an operation of the generating the user work based on the target video and posting the user work, in a case that a confirmation instruction triggered based on the posting confirmation window is received.

According to one or more embodiments of the present application, in the video processing method provided by the embodiments of the present application, the generating the user work based on the target video and posting the user work includes: directly posting the target video as the user work in response to the confirmation instruction.

According to one or more embodiments of the present application, in the video processing method provided by the embodiments of the present application, before posting the user work, the performing the target operation based on the target video further includes: switching from the session interface to a video posting interface; and performing editing processing on the target video to generate the user work in response to an editing instruction for the target video that is triggered based on the video posting interface.

According to one or more embodiments of the present application, in the video processing method provided by the embodiments of the present application, the generating the user work based on the target video and posting the user work includes: generating the user work based on the target video and posting the user work in response to a posting instruction triggered based on the video posting interface.

According to one or more embodiments of the present application, in the video processing method provided by the embodiments of the present application, after the performing the target operation based on the target video, the method further includes: switching back to the session interface from the video posting interface.

According to one or more embodiments of the present application, in the video processing method provided by the embodiments of the present application, the target video is a video received by the current user, and the preset control includes a video capture control. The displaying the identifier of the target video on the session interface includes: displaying the identifier of the target video on the session interface in response to a receiving instruction for the target video. The performing the target operation based on the target video in response to the triggering on the preset control includes: displaying a video capture interface in a target capture mode in response to a triggering on the video capture control, where the target capture mode is a capture mode associated with the target video.

According to one or more embodiments of the present application, in the video processing method provided by the embodiments of the present application, the generating the user work based on the target video and posting the user work includes: generating a user work based on the target video and posting the user work in response to a posting instruction triggered based on the video capture interface.

According to one or more embodiments of the present application, in the video processing method provided by the embodiments of the present application, after the performing the target operation based on the target video, the method further includes: switching back to the session interface from the video capture interface.

According to one or more embodiments of the present application, in the video processing method provided by the embodiments of the present application, the performing the target operation based on the target video further includes: displaying a video-posting progress indicator at a preset position of the session interface.

According to one or more embodiments of the present application, in the video processing method provided by the embodiments of the present application, the target video is a video received by the current user, and the preset control includes an associated-object control. The displaying the identifier of the target video on the session interface includes: displaying the identifier of the target video on the session interface in response to a receiving instruction for the target video. The performing the target operation based on the target video in response to the triggering of the preset control includes: displaying a preset interface associated with a target object in the target video in response to a triggering on the associated-object control.

According to one or more embodiments of the present application, a video processing apparatus is provided by the embodiments of the present application. The video processing apparatus includes: a first display module configured to display an identifier of a target video on a session interface, where the target video is a video sent or received by a current user; a second display module configured to display a preset control at an associated position of the identifier; and a processing module configured to perform a target operation based on the target video in response to a triggering on the preset control.

According to one or more embodiments of the present application, in the video processing apparatus provided by the embodiments of the present application, the target video is a video sent by the current user to a user in a session, and the preset control includes a video posting control. The first display module is specifically configured to display the identifier of the target video on the session interface in response to a sending instruction for the target video. The processing module is specifically configured to generate a user work based on the target video and post the user work in response to a triggering on the video posting control.

According to one or more embodiments of the present application, in the video processing apparatus provided by the embodiments of the present application, the processing module further includes: a first display unit configured to display a posting confirmation window before the user work is generated based on the target video and the user work is posted; and an operation unit configured to continue to perform an operation of the generating the user work based on the target video and posting the user work in a case that a confirmation instruction triggered based on the posting confirmation window is received.

According to one or more embodiments of the present application, in the video processing apparatus provided by the embodiments of the present application, the processing module is specifically configured to directly post the target video as the user work in response to the confirmation instruction.

According to one or more embodiments of the present application, in the video processing apparatus provided by the embodiments of the present application, the processing module further includes: a switching unit configured to switch from the session interface to a video posting interface before the user work is posted; a generating unit configured to perform editing processing on the target video to generate the user work in response to an editing instruction for the target video that is triggered based on the video posting interface; and a first posting unit configured to generate the user work based on the target video and post the user work in response to a posting instruction triggered based on a current interface, where the current interface includes the video posting interface.

According to one or more embodiments of the present application, in the video processing apparatus provided by the embodiments of the present application, the target video is a video received by the current user, and the preset control includes a video capture control. The first display module is specifically configured to display the identifier of the target video on the session interface in response to a receiving instruction for the target video. The processing module includes: a second display unit configured to display a video capture interface in a target capture mode in response to a triggering on the video capture control, where the target capture mode is a capture mode associated with the target video; and a second posting unit configured to generate the user work based on the target video and post the user work in response to a posting instruction triggered based on a current interface, where the current interface includes the video capture interface.

According to one or more embodiments of the present application, in the video processing apparatus provided by the embodiments of the present application, the video processing apparatus further includes: a switching module configured to switch back to the session interface from a current interface after the target operation is performed based on the target video. The current interface includes the video posting interface or the video capture interface.

According to one or more embodiments of the present application, in the video processing apparatus provided by the embodiments of the present application, the processing module further includes a third display unit configured to display a video-posting progress indicator at a preset position of the session interface.

According to one or more embodiments of the present application, in the video processing apparatus provided by the embodiments of the present application, the target video is a video received by the current user, and the preset control includes an associated-object control, The first display module is specifically configured to display the identifier of the target video on the session interface in response to a receiving instruction for the target video. The processing module is specifically configured to display a preset interface associated with a target object in the target video in response to a triggering on the associated-object control.

According to one or more embodiments of the present application, an electronic device is provided by the embodiments of the present application. The electronic device includes: one or more processors; a memory storage configured to store one or more programs, where the one or more programs, when executed by the one or more processors, cause the one or more processors to implement the video processing method described above.

According to one or more embodiments of the present application, a computer-readable storage medium is provided by the embodiments of the present application, on which a computer program is stored. The program, when executed by a processor, implements the video processing method described above.

A computer program product is provided according to the embodiments of the present application. The computer program product includes computer programs or instructions. The computer programs or instructions, when executed by a processor, implements the video processing method described above.

The above description only shows preferred embodiments of the present application and an illustration of applied technical principles. Those skilled in the art should understand that, the scope of the embodiments of the present application is not limited to the technical solutions formed by specific combinations of the technical features, and should also cover, other technical solutions formed by any combinations of the technical features and equivalent features thereof without departing from the disclosed concepts, for example, technical solutions formed by replacing the features with technical features with similar functions disclosed in the embodiments of the present application (but not limited to).

Furthermore, although operations are described in particular orders, this should not be construed as requiring the operations to be performed in the particular orders shown or in sequential orders. Under certain circumstances, multitasking and parallel processing may be advantageous. Likewise, although the above description includes several implementation details, these should not be construed as limitations on the scope of the embodiments of the present application. Certain features that are described in the context of separate embodiments may also be combined and implemented in a single embodiment. Conversely, various features that are described in the context of a single embodiment may also be implemented separately or in any suitable sub-combination in multiple embodiments.

Although the subject matters has been described in language specific to structural features and/or method logical operations, it should be understood that the subject matters defined in the claims is not necessarily limited to the specific features or operations described above. On the contrary, the specific features and operations described above are merely example forms of implementing the claims.

The invention claimed is:

1. A video processing method, comprising:
   displaying an identifier of a target video on a session interface, wherein the target video is a video sent or received by a current user in the session interface, wherein the session interface is an instant messaging interface configured to send or receive a message;
   displaying a preset control at an associated position of the identifier in the instant messaging interface; and
   performing a target operation based on the target video in response to a triggering on the preset control, wherein
   in response to the target video being the video received by the current user, the displaying a preset control at an associated position of the identifier in the instant messaging interface comprises: displaying a video capture control at the associated position of the identifier in the instant messaging interface; and
   the performing the target operation based on the target video in response to the triggering on the preset control comprises:
   displaying a video capture interface in a target capture mode, in response to a triggering on the video capture control, wherein the target capture mode is a capture mode associated with the target video.

2. The method according to claim 1, wherein in response to the target video being a video sent by the current user in the session interface, the displaying the identifier of the target video on the session interface comprises:
   displaying the identifier of the target video and a video posting control for the target video at the associated position of the identifier on the session interface in response to a sending instruction for the target video; and
   the performing the target operation based on the target video in response to the triggering on the preset control comprises:
   generating a user work based on the target video and posting the user work, in response to a triggering on the video posting control in the instant messaging interface.

3. The method according to claim 2, wherein before the generating the user work based on the target video and posting the user work, the performing the target operation based on the target video further comprises:
   displaying a posting confirmation window; and
   continuing to perform an operation of the generating the user work based on the target video and posting the user work, in response to a confirmation instruction triggered based on the posting confirmation window being received.

4. The method according to claim 3, wherein the generating the user work based on the target video and posting the user work comprises:
   directly posting the target video as the user work in response to the confirmation instruction.

5. The method according to claim 2, wherein before posting the user work, the performing the target operation based on the target video comprises:
   switching from the session interface to a video posting interface; and
   performing editing processing on the target video to generate the user work in response to an editing instruction for the target video that is triggered based on the video posting interface.

6. The method according to claim 5, wherein the generating the user work based on the target video and posting the user work comprises:
   generating the user work based on the target video and posting the user work, in response to a posting instruction triggered based on the video posting interface.

7. The method according to claim 6, wherein after the performing the target operation based on the target video, the method further comprises:
   switching back to the session interface from the video posting interface.

8. The method according to claim 2, wherein the performing the target operation based on the target video further comprises:
   displaying a video-posting progress indicator at a preset position of the session interface.

9. The method according to claim 1, wherein the preset control comprises a video capture control, and the displaying the identifier of the target video on the session interface comprises:
   displaying the identifier of the target video and the video capture control on the session interface in response to a receiving instruction for the target video.

10. The method according to claim 1, further comprising:
    generating a user work based on the target video and posting the user work, in response to a posting instruction triggered based on the video capture interface.

11. The method according to claim 10, wherein after the performing the target operation based on the target video, the method further comprises:
    switching back to the session interface from the video capture interface.

12. The method according to claim 1, wherein in response to the target video being the video received by the current user, the preset control comprises an associated-object control, and the displaying the identifier of the target video on the session interface comprises:
    displaying the identifier of the target video on the session interface in response to a receiving instruction for the target video; and
    the performing the target operation based on the target video in response to the triggering on the preset control comprises:

displaying a preset interface associated with a target object in the target video, in response to a triggering on the associated-object control.

13. An electronic device, comprising:
one or more processors; and
a memory storage configured to store one or more programs,
wherein the one or more programs, when executed by the one or more processors, cause the one or more processors to:
display an identifier of a target video on a session interface, wherein the target video is a video sent or received by a current user in the session interface, wherein the session interface is an instant messaging interface configured to send or receive a message;
display a preset control at an associated position of the identifier in the instant messaging interface; and
perform a target operation based on the target video in response to a triggering on the preset control,
wherein the one or more programs, when executed by the one or more processors, cause the one or more processors to:
in response to the target video being the video received by the current user, display a video capture control at the associated position of the identifier in the instant messaging interface; and display a video capture interface in a target capture mode, in response to a triggering on the video capture control, wherein the target capture mode is a capture mode associated with the target video.

14. The electronic device according to claim 13, wherein the one or more programs, when executed by the one or more processors, cause the one or more processors to:
in response to the target video being a video sent by the current user in the session interface, display the identifier of the target video and a video posting control for the target video at the associated position of the identifier on the session interface in response to a sending instruction for the target video; and
generate a user work based on the target video and post the user work, in response to a triggering on the video posting control in the instant messaging interface.

15. The electronic device according to claim 14, wherein the one or more programs, when executed by the one or more processors, cause the one or more processors to:
display a posting confirmation window before the user work is generated; and
continue to perform an operation of the generating the user work based on the target video and posting the user work, in response to a reception of a confirmation instruction triggered based on the posting confirmation window.

16. The electronic device according to claim 15, wherein the one or more programs, when executed by the one or more processors, cause the one or more processors to:
directly post the target video as the user work in response to the confirmation instruction.

17. The electronic device according to claim 14, wherein the one or more programs, when executed by the one or more processors, cause the one or more processors to:
switch from the session interface to a video posting interface before the user work is posted; and
perform editing processing on the target video to generate the user work in response to an editing instruction for the target video that is triggered based on the video posting interface.

18. The electronic device according to claim 17, wherein the one or more programs, when executed by the one or more processors, cause the one or more processors to:
generate the user work based on the target video and post the user work, in response to a posting instruction triggered based on the video posting interface.

19. The electronic device according to claim 18, wherein the one or more programs, when executed by the one or more processors, cause the one or more processors to:
switch back to the session interface from the video posting interface, after the target operation is performed based on the target video.

20. A non-transitory computer-readable storage medium, storing a computer program, wherein the program, when executed by a processor, causes the processor to:
display an identifier of a target video on a session interface, wherein the target video is a video sent or received by a current user in the session interface, wherein the session interface is an instant messaging interface configured to send or receive a message;
display a preset control at an associated position of the identifier in the instant messaging interface; and
perform a target operation based on the target video in response to a triggering on the preset control,
wherein the program, when executed by the processor, causes the processor to:
in response to the target video being the video received by the current user, display a video capture control at the associated position of the identifier in the instant messaging interface; and display a video capture interface in a target capture mode, in response to a triggering on the video capture control, wherein the target capture mode is a capture mode associated with the target video.

* * * * *